（12） United States Patent
Hattori et al.

(10) Patent No.: US 7,521,123 B2
(45) Date of Patent: Apr. 21, 2009

(54) TRANSPARENT CONDUCTIVE LAMINATE FILM, TOUCH PANEL HAVING THIS TRANSPARENT CONDUCTIVE LAMINATE FILM, AND PRODUCTION METHOD FOR THIS TRANSPARENT CONDUCTIVE LAMINATE FILM

(75) Inventors: Naohito Hattori, Aichi (JP); Kensuke Yoshioka, Handa (JP)

(73) Assignee: NOF Corporation, Tokyo (JP)

( * ) Notice: Subject to any disclaimer, the term of this patent is extended or adjusted under 35 U.S.C. 154(b) by 306 days.

(21) Appl. No.: 10/514,189

(22) PCT Filed: May 23, 2003

(86) PCT No.: PCT/JP03/06460

§ 371 (c)(1),
(2), (4) Date: Nov. 10, 2004

(87) PCT Pub. No.: WO03/100794

PCT Pub. Date: Dec. 4, 2003

(65) Prior Publication Data

US 2005/0170158 A1 Aug. 4, 2005

(30) Foreign Application Priority Data

May 23, 2002 (JP) .............................. 2002-149877

(51) Int. Cl.
*B32B 15/00* (2006.01)
(52) U.S. Cl. ........................ 428/428; 428/432; 428/430; 428/702

(58) Field of Classification Search ....................... None
See application file for complete search history.

(56) References Cited

U.S. PATENT DOCUMENTS 4,977,013 A 12/1990 Ritchie et al.
6,617,056 B1 * 9/2003 Hara et al. .................. 428/697

FOREIGN PATENT DOCUMENTS

| JP | 04-154647 | 5/1992 |
|---|---|---|
| JP | 06-222352 | 8/1994 |
| JP | 6-218864 | 9/1994 |
| JP | 07-257944 | 10/1995 |
| JP | 08-240800 | 9/1996 |

(Continued)

OTHER PUBLICATIONS

International Search Report for International Appl. No. PCT/JP03/06460 mailed Sep. 9, 2003.

*Primary Examiner*—Timothy M Speer
(74) *Attorney, Agent, or Firm*—Caesar, Revise, Bernstein, Cohen & Pokotilow, Ltd.

(57) ABSTRACT

A touch panel-use transparent conductive laminate film little in coloring of transmitted beam and high in transmittance. The transparent conductive laminate film (100) comprises an intermediate layer (B) laminated on a transparent substrate (A) and having an optical film thickness of 100-175 nm, and a conductive layer (C) having an optical film thickness of 10-60 nm, the refractive index of the intermediate layer being between that of the substrate and that of the conductive layer at 1.7-1.85.

12 Claims, 3 Drawing Sheets

FOREIGN PATENT DOCUMENTS

| | | |
|---|---|---|
| JP | 11-286066 | 10/1999 |
| JP | 2000-222945 | 8/2000 |
| JP | 2000-301648 | 10/2000 |
| JP | 2001-228305 | 8/2001 |
| JP | 2003-080624 | 3/2003 |
| TW | 430826 | 4/2006 |
| WO | 00/63924 | 10/2000 |

* cited by examiner

TRANSPARENT CONDUCTIVE LAMINATE FILM, TOUCH PANEL HAVING THIS TRANSPARENT CONDUCTIVE LAMINATE FILM, AND PRODUCTION METHOD FOR THIS TRANSPARENT CONDUCTIVE LAMINATE FILM

TECHNICAL FIELD

The present invention relates to a transparent conductive laminate film which is simple, low in production cost and little in coloring, and a touch panel using the same.

BACKGROUND ART

A touch panel is known as a device provided on a display surface of various display apparatuses, such as a liquid crystal display and a cathode ray tube (CRT), and enables input of information by touching the screen. Typical forms of touch panels include a resistive touch panel having two electrode substrates which are arranged so that the conductive layer provided on each substrate is faced with each other.

Conventional electrode substrates for resistive touch panels include a substrate made of a glass plate, a resin plate or a thermoplastic polymer film, and a conductive layer formed on the substrate. The conductive layer contains a conductive metal oxide such as indium tin oxide (ITO) and zinc oxide.

In conventional electrode substrates, transmittance of visible light having a relatively short wavelength is decreased due to reflection and absorption on the conductive layer. The total transmittance is therefore decreased and the light transmitted through the touch panel becomes yellow or brown, making it difficult to show accurate color of the display device on the touch panel.

In order to solve the problem, Japanese Patent Laid-Open Publication No. 6-218864 as the first prior art proposes a laminate in which a high refractive index layer having a refractive index higher than that of both the conductive layer and the substrate is formed between the conductive layer and the substrate, and a laminate in which a low refractive index layer having a refractive index lower than that of both the conductive layer and the substrate is formed between the conductive layer and the substrate. According to the first prior art laminates, the reflectance at a wavelength around 550 nm is decreased as shown in FIG. 5, while the transmittance at a wavelength around 550 nm is improved as shown in FIG. 6. Consequently, the total transmittance is improved. However, the problem of coloring of transmitted light to yellow or brown has not been solved.

Japanese Patent Laid-Open Publication No. 11-286066 as the second prior art proposes a conductive film in which a multilayer optical film is laminated between the conductive layer and the substrate.

The second prior art conductive film, however, has complicated structure and is high in production cost because it has a number of optical films.

SUMMARY OF THE INVENTION

An object of the present invention is to provide a transparent conductive laminate film which is simple, low in production cost and little in coloring of transmitted light, and a touch panel provided with the laminate film.

The present inventors have found that a transparent conductive material capable of preventing coloring of transmitted light can be produced by laminating a substrate, an intermediate refractive index layer having specific properties and a conductive layer having specific properties in a specific order.

According to an aspect of the present invention, a transparent conductive laminate film including a light transmitting substrate, an intermediate layer laminated on one or both surfaces of the substrate directly or indirectly via at least one layer and a conductive layer laminated on the intermediate layer is provided. The optical thickness of the intermediate layer is 100 to 175 nm and the optical thickness of the conductive layer is 10 to 60 nm. The intermediate layer has a refractive index of 1.7 to 1.85, which is between that of the substrate and that of the conductive layer.

According to another aspect of the present invention, a method of producing a transparent conductive laminate film is provided. The method includes providing a light transmitting substrate, forming on one surface of the substrate an intermediate layer having an optical thickness of 100 to 175 nm and a refractive index of 1.7 to 1.85 which is greater than the refractive index of a substrate and forming on the intermediate layer a conductive layer having an optical thickness of 10 to 60 nm and a refractive index greater than the refractive index of the intermediate layer.

"DETAILED DESCRIPTION OF THE PREFERRED EMBODIMENT"

Figure 1:
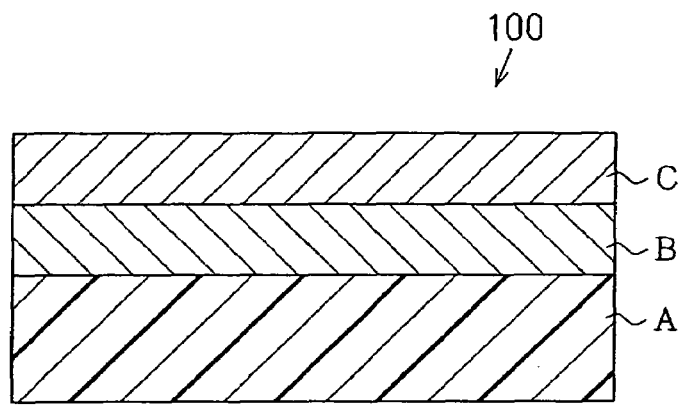
FIG. 1 is a schematic cross sectional view of a transparent conductive laminate film of Example 1 of the present invention.

A preferred embodiment of the present invention will now be described in detail.

A transparent conductive laminate film according to a preferred embodiment includes a light transmitting substrate A, an intermediate refractive index layer B laminated on one or both surfaces of the substrate A directly or indirectly via at least one layer and a conductive layer C. The optical thickness of the intermediate refractive index layer B is 100 to 175 nm and the optical thickness of the conductive layer C is 10 to 60 nm. The refractive index of the intermediate refractive index layer B is 1.7 to 1.85, and the refractive index of the substrate A is less than the refractive index of the intermediate refractive index layer B, and the refractive index of the intermediate refractive index layer B is less than the refractive index of the conductive layer C (refractive index of substrate A<refractive index of intermediate refractive index layer B<refractive index of conductive layer C). The optical thickness refers to the product (n×d) of refractive index n and thickness d of a layer.

The substrate A is not particularly limited as long as it is a known transparent material. As the substrate A, for example, glass or transparent resins such as polyethylene terephthalate (PET), polybutylene terephthalate, polycarbonate, a poly(m- ethyl methacrylate) copolymer, triacetyl cellulose, polyolefin, polyamide, poly(vinyl chloride) and amorphous polyolefin are preferable.

The form of the substrate A is, for example, a plate or a film. From the viewpoint of productivity and transportation, a plastic film is preferable. In view of the transparency and productivity, thickness of the substrate A is preferably 10 to 500 µm, more preferably 50 to 200 µm.

Next, the intermediate refractive index layer B is described. Since the intermediate refractive index layer B having a specific refractive index and a specific optical thickness is formed between the substrate A and the conductive layer C, the transparent conductive laminate film of the present embodiment has reduced reflection of purple light to blue light, whereby the coloring of the transmitted light is reduced.

The refractive index of the intermediate refractive index layer B is 1.7 to 1.85, which is greater than the refractive index of the substrate A and less than the refractive index of the conductive layer C. If the refractive index of the intermediate refractive index layer B is less than 1.7 or greater than 1.85, the degree of coloring of the transmitted light increases.

The optical thickness of the intermediate refractive index layer B is preferably in the range of 100 to 175 nm. By setting the optical thickness of the intermediate refractive index layer B to a pre-determined range, the reflectance of blue light (wavelength around 400 nm) is particularly decreased. When the optical thickness is less than 100 nm or greater than 175 nm, the coloring of the transmitted light becomes greater.

The material constituting the intermediate refractive index layer B is not particularly limited as long as the refractive index does not exceed the specific range and the object of the present embodiment is not impaired, and a known material can be used. For example, an inorganic substance or a mixture of an inorganic substance and an organic substance can be used. Here, as the inorganic substance, for example, metal oxides such as zinc oxide, titanium oxide, cerium oxide, aluminum oxide, silane oxide, tantalum oxide, yttrium oxide, ytterbium oxide, zirconium oxide, indium tin oxide and antimony tin oxide can be used. Of these, zirconium oxide, titanium oxide, indium tin oxide, antimony tin oxide and cerium oxide are preferable, and zirconium oxide is most preferable from the viewpoint of the refractive index, electrical insulating property and light resistance.

The method for forming the intermediate refractive index layer B is not particularly limited, and for example, dry coating methods such as a vapor deposition method, a sputtering method, an ion plating method, a chemical vapor deposition (CVD) method and a plating method can be adopted. Of these, in view of the easiness of controlling the thickness of the layer, the vapor deposition method and the sputtering method are preferable.

When the intermediate refractive index layer B is made from a mixture of an inorganic substance and an organic substance, for example, when the inorganic substance is fine particles of the aforementioned metal oxide and the organic substance is a curable monomer, the refractive index of the intermediate refractive index layer B can be easily adjusted and the intermediate refractive index layer B can be easily prepared. It is preferable that the average particle size of the fine particles of the metal oxide does not exceed the thickness of the intermediate refractive index layer B by far. Specifically, the average particle size of the fine particles of the metal oxide is preferably not more than 0.1 µm, more preferably not more than 0.05 µm, and most preferably 0.01 to 0.05 µm. A greater average particle size causes scattering and reduction of the transparency of the intermediate refractive index layer B, and therefore is not preferable.

If necessary, the surface of the fine particles can be modified by a coupling agent. As coupling agents, for example, a silicon compound, a metal alkoxide obtained by substitution with an organic group in a compound containing a metal such as aluminum, titanium, zirconium and antimony and an organic acid salt can be used.

The curable monomer is not particularly limited and known one can be used. For example, a mono-functional or multi-functional (meth)acrylic acid ester, a silicon compound such as tetraethoxysilane can be used. The curable monomer is preferably an ultraviolet curable monomer in view of the productivity and layer strength of the intermediate refractive index layer B, and a multi-functional monomer is preferably used in view of the improvement of the layer strength. For these reasons, ultraviolet curable, multi-functional acrylates and silicon compounds are most preferable.

As the ultraviolet curable, multi-functional acrylate, for example, multi-functional alcohol derivatives such as dipentaerythritol hexaacrylate, tetramethylolmethane tetraacrylate, tetramethylolmethane triacrylate, pentaerythritol pentaacrylate, trimethylolpropane triacrylate, 1,6-hexanediol diacrylate, 1,6-bis(3-acryloyloxy-2-hydroxypropyloxy)hexane and urethane acrylates such as polyethylene glycol diacrylate, pentaerythritol triacrylate and hexamethylene diisocyanate urethane prepolymer can be used. As the curable monomer, a mixture of one or more kinds of the aforementioned monomers or those to which another component is added can be used.

The mixing ratio of the fine particles of the metal oxide and the curable monomer (the weight ratio of fine particles of metal oxide/curable monomer) is preferably 50/50 to 90/10, more preferably 60/40 to 85/15. When the ratio of the fine particles of the metal oxide is less than 50 parts by weight, i.e., the ratio of the curable monomer is more than 50 parts by weight, an intermediate refractive index layer B having a desired refractive index cannot be obtained. When the ratio of the fine particles of the metal oxide is more than 90 parts by weight, i.e., the ratio of the curable monomer is less than 10 parts by weight, the molding property and strength of the intermediate refractive index layer B tend to decrease.

In the range that the effect of the present embodiment is not impaired, additives such as an inorganic or organic pigment, a polymer, a polymerization initiator, a polymerization inhibitor, an antioxidant, a dispersant, a surfactant, a light stabilizer, a light absorbing agent and a leveling agent may be added to the material of the intermediate refractive index layer B.

When the drying step is conducted after forming a layer according to a wet coating method, an optional amount of solvent may be added to the material of the intermediate refractive index layer B. When the material of the intermediate refractive index layer B is a mixture of an inorganic substance and an organic substance, the intermediate refractive index layer B is usually formed by a wet coating method. As the wet coating method, a roll coating method, a spin coating method and a dip coating method are known. Preferable wet coating methods are the roll coating method and the dip coating method which enable continuous layer forming and are high in productivity.

A conductive circuit of the transparent conductive laminate film is formed on the conductive layer C. The material of the conductive layer C is not particularly limited, but a metal or a metal oxide is preferably used. For example, a transparent conductive layer containing a metal such as gold, silver, copper, platinum and nickel or a metal oxide such as tin oxide, indium tin oxide (ITO) and antimony tin oxide is preferable. Of these, indium tin oxide (ITO) is more preferable from the viewpoint of conductivity, transparency and stability.

The method for forming the conductive layer C is not particularly limited, and for example, a dry coating method such as a vapor deposition method, a sputtering method, an ion plating method, a CVD method and a plating method can be adopted. Of these, from the viewpoint of controlling the thickness of the layer, the vapor deposition method and the sputtering method are particularly preferable.

The layer thickness of the conductive layer C is in the range of 10 to 60 nm in terms of the optical thickness. When the optical thickness is less than 10 nm, the surface resistance becomes high. On the other hand, when the optical thickness is more than 60 nm, the transparency decreases.

A hard coat layer, for example, may be formed between the substrate A and the intermediate refractive index layer B to improve hardness. For anti-dazzling, preventing a Newton ring from occurring, improving adhesion between the layers and blocking light having a specific wavelength, at least one functional layer may be formed. As the material of the functional layer, inorganic substances such as silicon oxide, organic substances such as ultraviolet-curable and multi-functional acrylate or a mixture thereof may be used. The thickness of the functional layer is preferably 0.005 to 20 μm, and the refractive index is preferably in the range of 1.45 to 1.65. The method of forming the functional layer is not particularly limited, and known methods such as dry coating methods and wet coating methods can be used.

As long as the effect of the present embodiment is not impaired, additives such as an inorganic filler, an inorganic or organic pigment, a polymer, a polymerization initiator, a polymerization inhibitor, an antioxidant, a dispersant, a surfactant, a light stabilizer, a light absorbing agent and a leveling agent may be added to the material of the functional layer. When the drying step is conducted after forming a layer according to a wet coating method, an optional amount of solvent may be added to the material of the functional layer.

By adjusting the refractive index and the optical thickness of each layer so that the reflectance curve of the surface closer to the conductive layer in the transparent conductive laminate film has a local minimal value in the wavelength range of 380 to 500 nm, reflection of purple to blue light can be further reduced and the coloring of the transmitted light can be further reduced.

In the following, the wavelength at which the reflectance exhibits the local minimal value is referred to as a local minimum reflectance wavelength. When the local minimum reflectance wavelength is shorter than 380 nm or longer than 500 nm, the transmitted light tends to be colored because the effect of reducing the reflection of purple to blue light is low or because the reflection becomes greater.

By adjusting the refractive index and the optical thickness of each layer so that the local minimum reflectance wavelength on the surface closer to the aforementioned conductive layer is in the range of 380 to 500 nm, the color difference of the transmitted light indicated by L*a*b* color system in accordance with JIS Z8729 falls into the range of −2<a*<2, −2<b*<2. Accordingly, a transparent conductive laminate film substantially free of the problem of coloring can be produced.

When the refractive index and the optical thickness are adjusted so that the local minimum reflectance wavelength is in the range of 450 to 500 nm, the reflection of purple to blue light can be further decreased. As a result, the coloring of the transmitted light is further decreased, and it is more preferable because the total transmittance of the transparent conductive laminate film in accordance with JIS K7361-1 becomes not less than 85%.

The transparent conductive laminate film can be used for purposes which require a high light transmittance and superior color tone as a conductive material. In particular, it can be used for electronic image display devices such as an organic or inorganic electro luminescence display and a liquid crystal display or for electrode substrates of resistive touch panels.

If necessary, an adhesion layer can be formed in advance on the surface of the transparent conductive laminate film where the conductive layer is not formed and the laminate film can be used by adhering to the object. The material to be used for the adhesion layer is not particularly limited, and examples thereof include a silicone adhesive, an acrylic adhesive, an ultraviolet curable adhesive and a thermosetting adhesive.

When the laminate film is used as an upper (contact surface side) electrode substrate in a resistive touch panel, a hard coat layer is preferably formed on the surface of the transparent conductive laminate film opposite to the conductive layer C for improving the surface strength. At least one kind of property such as anti-dazzling property, antistatic property and reduced reflection can be imparted to the hard coat layer. The surface of the transparent conductive laminate film opposite to the conductive layer C can be closely laminated to the backside of the substrate having a hard coat layer via an adhesive layer.

When used as an lower (display device side) electrode substrate of a resistive touch panel, the transparent conductive laminate film can be used as it is or by laminating with a substrate such as glass or plastic. In addition, on the backside, an anti-reflection layer including at least one layer can be formed directly or indirectly via one or more layers, or a substrate having an anti-reflection layer can be laminated to improve the light transmittance. The anti-reflection layer is not particularly limited and known materials can be used.

The transparent conductive laminate film of the present embodiment is composed of an intermediate refractive index layer B having an optical thickness of 100 to 175 nm on a substrate A and a conductive layer C having an optical thickness of 10 to 60 nm laminated thereon. That is, the transparent conductive laminate film is made by forming only an intermediate refractive index layer B between the substrate A and the conductive layer C. Therefore, the structure is simpler than the multi-layer structure and the film can be prepared easily.

Figure 3:
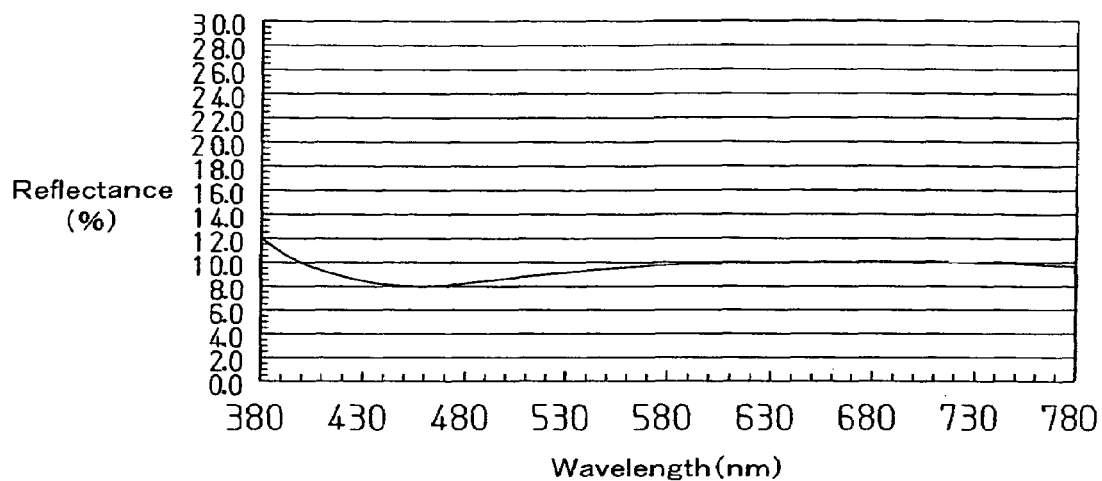
FIG. 3 and FIG. 4 are graphs showing reflectance and transmittance of the transparent conductive laminate film of a preferred embodiment of the present invention, respectively.
Figure 4:
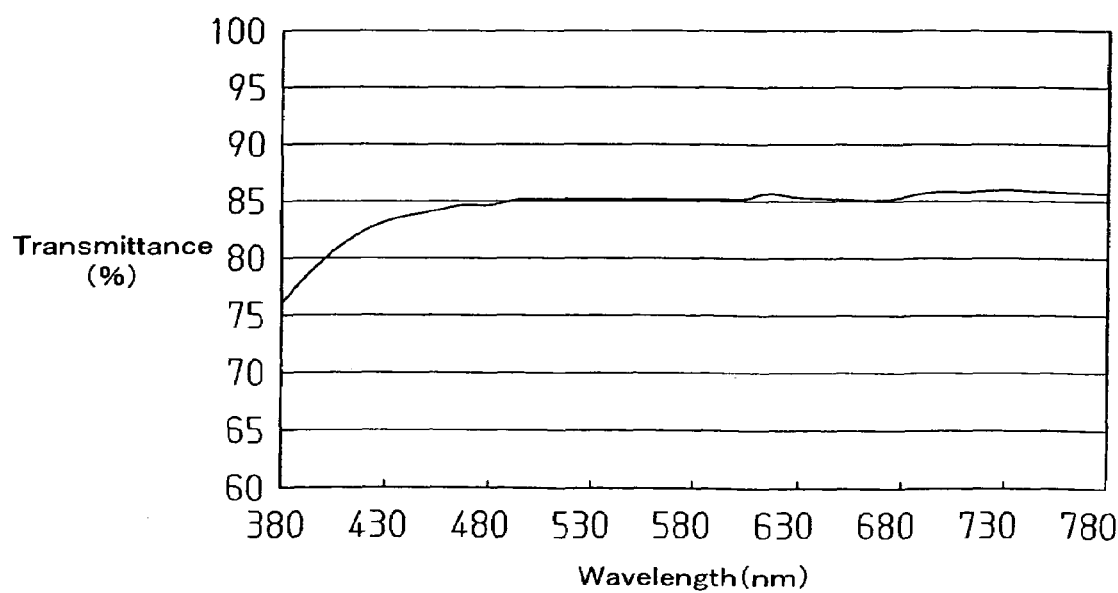
Figure 5:
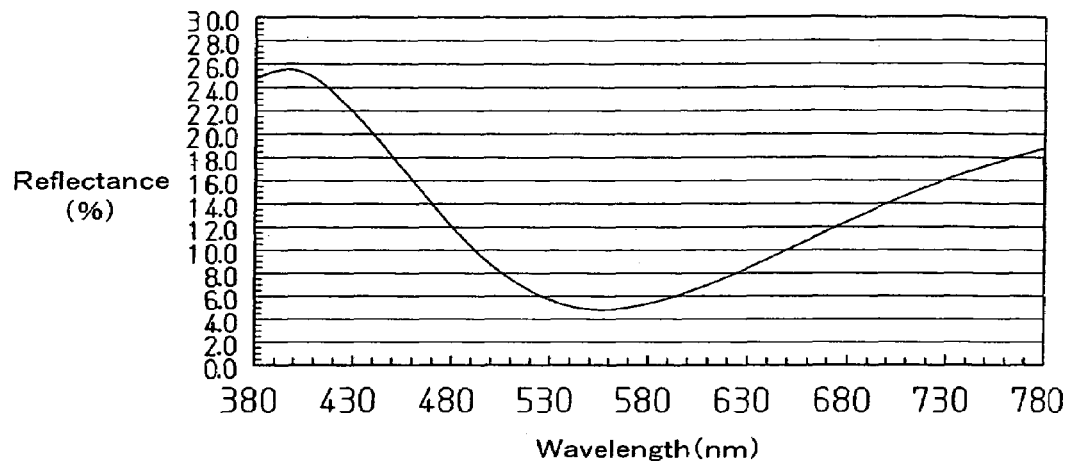
FIG. 5 and FIG. 6 are graphs showing reflectance and transmittance of a conventional transparent conductive laminate film, respectively.
Figure 6:
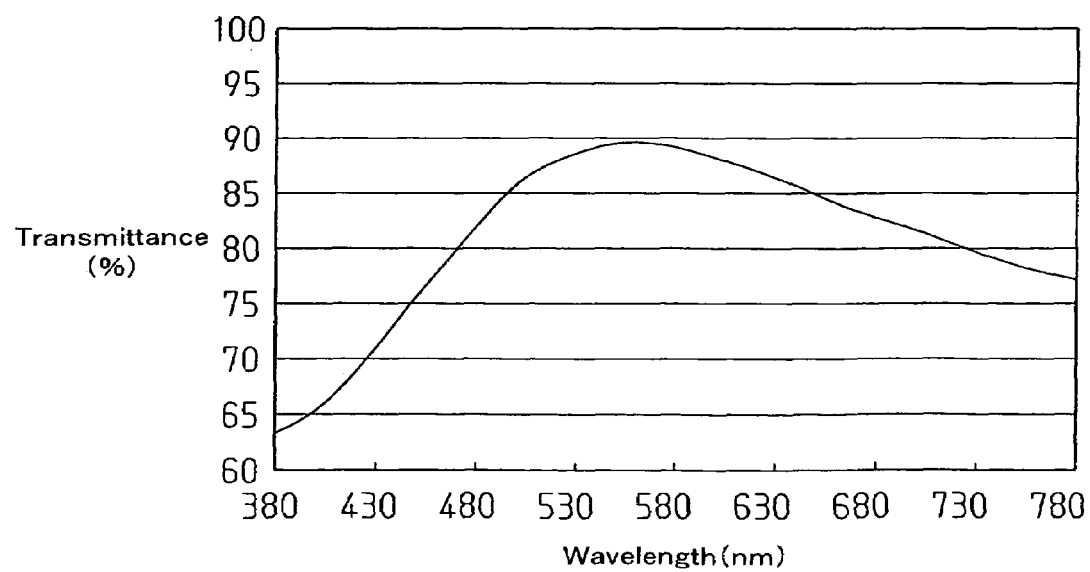

The refractive index of the intermediate refractive index layer B is 1.7 to 1.85 and greater than the refractive index of substrate A and less than the refractive index of the conductive layer C. Accordingly, as shown in FIG. 3, the reflectance of the light incident upon the transparent conductive laminate film is decreased and nearly fixed in the wavelength range of 400 to 780 nm, and the coloring of the transmitted light is inhibited. Further, as shown in FIG. 4, the transmittance (total transmittance) is nearly fixed at 85% and the transmitted light is bright. As mentioned above, because the refractive index of the intermediate refractive index layer B is adjusted to a value between the refractive index of the substrate A and the refractive index of the conductive layer C, the characteristic curve of the reflectance of the transparent conductive laminate film relative to wavelength is relatively flat (the difference between the local maximal value and the local minimal value of the reflectance is relatively small). Therefore, the coloring of the transmitted light can be prevented. In addition, the transmittance is high regardless of the wavelength and nearly fixed, and therefore the transmitted light can be made bright.

The following advantages are obtained by the preferred embodiment.

In the transparent conductive laminate film, a substrate A, an intermediate refractive index layer B and a conductive layer C are laminated in that order, directly or indirectly via at least one layer. The optical thickness of the intermediate refractive index layer B is 100 to 175 nm, and the optical thickness of the conductive layer C is 10 to 60 nm. The refractive index of the intermediate refractive index layer B is 1.7 to 1.85, which is between the refractive index of the substrate A and the refractive index of the conductive layer C. Accordingly, the coloring of the transmitted light can be reduced. In addition, since the number of layers constituting the laminate film is small, the transparent conductive laminate film has a simple constitution and can be produced easily at a low cost. Accordingly, the transparent conductive laminate film of the present embodiment is useful as an electrode substrate for touch panels.

Since the conductive layer C is formed by a metal or a metal oxide, an excellent surface resistance can be obtained.

The conductive layer C can be easily formed by a method selected from a vacuum deposition method, an ion plating method, a CVD method and a sputtering method using indium tin oxide.

Since the substrate A is a plastic film having a thickness of 10 to 500 μm, the transparent conductive laminate film can exhibit stable transparency.

Since the intermediate refractive index layer B is formed by a wet coating method using raw materials, film forming can be conducted with ease and the cost for producing a transparent conductive laminate film can be reduced.

In the transparent conductive laminate film, the local minimum reflectance wavelength on the surface closer to the conductive layer C is in the range of 380 to 500 nm. Accordingly, the blue reflection light in the reflection spectrum can be reduced and coloring to yellow can be reduced.

In the transparent conductive laminate film, the local minimum reflectance wavelength on the surface closer to the conductive layer C is in the range of 450 to 500 nm. Accordingly, coloring to yellow can be reduced without decreasing the total transmittance.

Since the color difference of the transmitted light indicated by the L*a*b* color system in accordance with JIS Z8729 is −2<a*<2 and −2<b*<2, and close to zero, the coloring of the transparent conductive laminate film can be prevented.

EXAMPLES

Examples of the present invention will now be explained in more detail. The present invention is not limited to the following Examples. The refractive indexes of the layers other than the conductive layer were measured according to the following procedure.

(1) Coating solutions for each layer were coated on a PET film having a refractive index of 1.63 (product name: A4100, available from Toyobo Co., Ltd.) using a dip coater (made by SUGIYAMA-GEN RIKAGAKUKIKI CO., LTD.), while adjusting the optical thickness (n×d) to about 110 nm after drying.

(2) The coated layer was dried and then hardened by irradiation of ultraviolet ray (ultraviolet irradiation apparatus: 120W high pressure mercury lamp, 400 mJ, made by IWASAKI ELECTRIC Co., Ltd.,) under nitrogen atmosphere.

(3) The backside of the PET film (the side opposite to the cured layer) was roughened by polishing using sandpaper and coated over with a black coating to prepare a test piece. The specular reflection spectrum (380 to 780 nm, +5°, −5°) of the test piece was measured using a spectrophotometer (product name "U-best 50", made by JASCO Corporation).

(4) The refractive index was calculated using the local maximal value or the local minimal value of the reflectance obtained from the reflection spectrum, based on the following formula.

$$\text{Local minimal value of reflectance}(\%) = \left\{\frac{n_M - n^2}{n_M + n^2}\right\}^2 \times 100 \quad (1)$$

where $n_M$ represents the refractive index of the PET film and n represents the refractive index of the layer.

As for the refractive index of the conductive layer, a conductive layer was formed on a PET film having a refractive index of 1.63 (product name: A4100, available from Toyobo Co., Ltd.), so that the optical thickness (n×d) became about 110 nm, and the refractive index was measured according to the aforementioned procedures (3) and (4).

Preparation Example 1

Preparation of Coating Solution for Intermediate Refractive Index Layer (H-1)

A coating solution for intermediate refractive index layer (H-1) was prepared by mixing 80 parts by weight of fine particles of zirconium oxide (average particle size: 0.04 μm), 15 parts by weight of tetramethylolmethane triacrylate, 900 parts by weight of butyl alcohol, and 1 part by weight of a photopolymerization initiator (product name IRGACURE 907 available from Ciba-Geigy Ltd). The refractive index of the cured product obtained by ultraviolet curing of the coating solution H-1 was 1.77.

Preparation Example 2

Preparation of Coating Solution for Intermediate Refractive Index Layer H-2

Eighty parts by weight of fine particles of titanium oxide (average particle size: 0.03 μm) was used instead of 80 parts by weight of the fine particles of zirconium oxide (average particle size: 0.04 μm). Except for that, coating solution for intermediate refractive index layer H-2 was prepared in the same manner as in Preparation Example 1. The refractive index of the cured product obtained by ultraviolet curing of the coating solution H-2 was 1.85.

Preparation Example 3

Preparation of Coating Solution for Hard Coat Layer (HC-1)

A coating solution for hard coat layer HC-1 was prepared by mixing 70 parts by weight of dipentaerythritol hexacrylate, 30 parts by weight of 1,6-diacryloyloxy hexane, 4 parts by weight of photopolymerization initiator (product name: IRGACURE 184 available from Ciba-Geigy Ltd.) and 100 parts by weight of isopropyl alcohol. The refractive index of the cured product obtained by ultraviolet curing of the coating solution HC-1 was 1.52.

Preparation Example 4

Preparation of Hard-Coat Treated PET Film

The coating solution HC-1 prepared in Preparation Example 3 was coated on a PET film having a thickness of 188 μm (product name: A4100, available from Toyobo Co., Ltd., refractive index 1.63) using a bar coater so that the layer thickness after drying became about 5 μm to form a coating solution layer. The coating solution layer was cured by irradiation of ultraviolet ray (ultraviolet irradiation apparatus: 120W high pressure mercury lamp, 400 mJ, made by IWASAKI ELECTRIC Co., Ltd.,) to prepare a hard-coat treated PET film.

Preparation Example 5

Preparation of dispersion of silica fine particles (L-1)

A dispersion of silica fine particles (L-1) was prepared by mixing 25 parts by weight of tetramethylolmethane triacrylate, 220 parts by weight of dispersion of silica fine particles (product name: XBA-ST, available from NISSAN CHEMICAL INDUSTRIES, LTD.), 900 parts by weight of butyl alcohol and 5 parts by weight of photopolymerization initiator (product name: KAYACURE BMS, available from NIPPON KAYAKU CO., LTD.). The refractive index of the cured product obtained by ultraviolet curing of the dispersion L-1 was 1.50.

Example 1

An intermediate refractive index layer B was formed on a PET film having a thickness of 188 μm (product name: A4100, available from Toyobo Co., Ltd., refractive index 1.63) using the coating solution for intermediate refractive index layer H-1 according to the following method.

A coating solution layer was formed by applying the coating solution for intermediate refractive index layer H-1 in an amount that the optical thickness after curing became 160 nm using a dip coater (made by SUGIYAMA-GEN RIKAGAKUKIKI CO., LTD.). The coating solution layer was dried and cured by irradiation of ultraviolet ray (ultraviolet irradiation apparatus: 120W high pressure mercury lamp, 400 mJ, made by IWASAKI ELECTRIC Co., Ltd.,) under nitrogen atmosphere to form an intermediate refractive index layer B.

The film having an intermediate refractive index layer B was subjected to pre-drying at 100° C. for an hour. By sputtering using an ITO (indium:tin=92:8 refractive index after forming layer 2.00) target, a conductive layer C having an optical thickness of 40 nm was formed on the intermediate refractive index layer B. The transparent conductive laminate film 100 of FIG. 1 was prepared.

The transparent conductive laminate film 100 has a substrate A including PET film, an intermediate refractive index layer B formed on the substrate A and a conductive layer C formed on the layer B.

Then, the total transmittance, the local minimum reflectance wavelength, the color difference of the transmitted light (a*, b*) and the surface resistance of film 100 were measured according to the following method. The results are shown in Table 1.

(1) The total transmittance was measured by using a haze meter (product name: NDH2000, made by Nippon Denshoku Industries Co., Ltd.).

(2) The local minimum reflectance wavelength was obtained from the reflection spectrum measured at 380 to 780 nm by using a spectrophotometer (product name: UV1600, made by Shimadzu Corporation).

(3) The transmitted color difference (a*, b*) was measured by using a color-difference meter (product name: SQ-2000, made by Nippon Denshoku Industries Co., Ltd.).

(4) The surface resistance was measured by using a surface resistivity meter (product name: Loresta MP MCP-T350, made by Mitsubishi Chemical Corporation).

TABLE 1

| | Examples | | | | Comparative Examples | | | | | |
|---|---|---|---|---|---|---|---|---|---|---|
| | 1 | 2 | 3 | 4 | 1 | 2 | 3 | 4 | 5 | 6 |
| refractive index of intermediate layer | 1.77 | 1.77 | 1.77 | 1.85 | — | 1.77 | 1.77 | 1.50 | 2.30 | — |
| optical thickness of intermediate layer (nm) | 160 | 120 | 160 | 160 | — | 90 | 190 | 160 | 160 | — |
| Hard Coat Layer | none | none | formed | formed | none | none | none | none | none | none |
| total transmittance (%) | 86.1 | 82.2 | 87.5 | 87.8 | 86.2 | 81.2 | 88.1 | 87.1 | 75.1 | 88.9 |
| local minimal reflectance wavelength (nm) | 480 | 400 | 500 | 500 | — | 350 | 530 | — | 430 | 550 |
| color difference of transmitted light a* | −1.1 | 0.7 | −1.3 | −1.6 | −0.3 | 0.8 | −2.4 | −0.1 | −0.1 | −3.9 |
| color difference of transmitted light b* | 0.5 | −0.8 | 0.3 | 0.2 | 3.0 | 2.2 | 4.6 | 5.1 | −8.2 | 5.9 |
| surface resistance (Ω) | $3 \times 10^2$ | $3 \times 10^2$ | $3 \times 10^2$ | $3 \times 10^2$ | $3 \times 10^2$ | $3 \times 10^2$ | $3 \times 10^2$ | $3 \times 10^2$ | $3 \times 10^2$ | $3 \times 10^2$ |

Example 2

A transparent conductive laminate film was prepared in the same manner as in Example 1 except that the optical thickness after curing was changed to 120 nm.

Example 3

A transparent conductive laminate film was prepared in the same manner as in Example 1 except that the hard-coat treated PET film prepared in Preparation Example 4 was used instead of the PET film.

Example 4

A transparent conductive film was prepared in the same manner as in Example 3 except that the refractive index of the intermediate layer was changed to 1.85.

Comparative Example 1

A transparent conductive laminate film was prepared by forming a conductive layer C directly on a PET film having a thickness of 188 μm (product name: A4100, available from Toyobo Co., Ltd., refractive index 1.63), in the same manner as in Example 1.

Comparative Example 2

A transparent conductive laminate film was prepared in the same manner as in Example 1 except that the optical thickness after curing was changed to 90 nm.

Comparative Example 3

A transparent conductive laminate film was prepared in the same manner as in Example 1 except that the optical thickness after curing was changed to 190 nm.

Comparative Example 4

A transparent conductive film was prepared in the same manner as in Example 1 except that the optical thickness after curing was changed to 160 nm and the dispersion of silica fine particles (L-1) (refractive index: 1.50) was used instead of the coating solution for intermediate refractive index layer H-1.

Comparative Example 5

A metal oxide layer (refractive index: 2.30, optical thickness: 160 nm) was formed on a PET film having a thickness of 188 μm (product name: A4100, available from Toyobo Co., Ltd., refractive index: 1.63) as an intermediate refractive index layer by sputtering using a titanium oxide target. A transparent conductive laminate film was prepared by forming a conductive layer (optical thickness: 40 nm) on the metal oxide layer by sputtering using an ITO (indium:tin=92:8) target.

Comparative Example 6

A transparent dielectric film having a thickness of 100 nm and a refractive index of 2.35 was formed on one surface of a PET film by vacuum deposition of titanium oxide according to electron beam heating under a reduced pressure of 1 to $2 \times 10^{-4}$ Torr (1.33 to $2.66 \times 10^{-2}$ Pa). Then, a conductive layer C was formed in the same manner as in Example 1 to prepare a transparent conductive laminate film.

As shown in Table 1, the transparent conductive films of Example 1 to 4 had a low surface resistance and were highly conductive. In addition, the small transmitted color difference (a*,b*) reveals that the coloring was little.

On the other hand, in Comparative Examples 1 and 6 which have no intermediate refractive index layer B and in Comparative Examples 2 and 3 in which the optical thickness of the intermediate refractive index layer B is outside the pre-determined range and in Comparative Example 4 in which the refractive index of the intermediate refractive index layer is less than the pre-determined range, it was shown that the transmitted color difference, in particular, the value of b* became greater, causing the coloring of the transmitted light.

In Comparative Example 5 in which the refractive index of the intermediate refractive index layer is higher than the refractive index of the conductive layer, it was shown that the transmitted color difference, in particular, the value of b* became extremely small, causing the coloring of the transmitted light.

Examples 5 and 6

Figure 2:
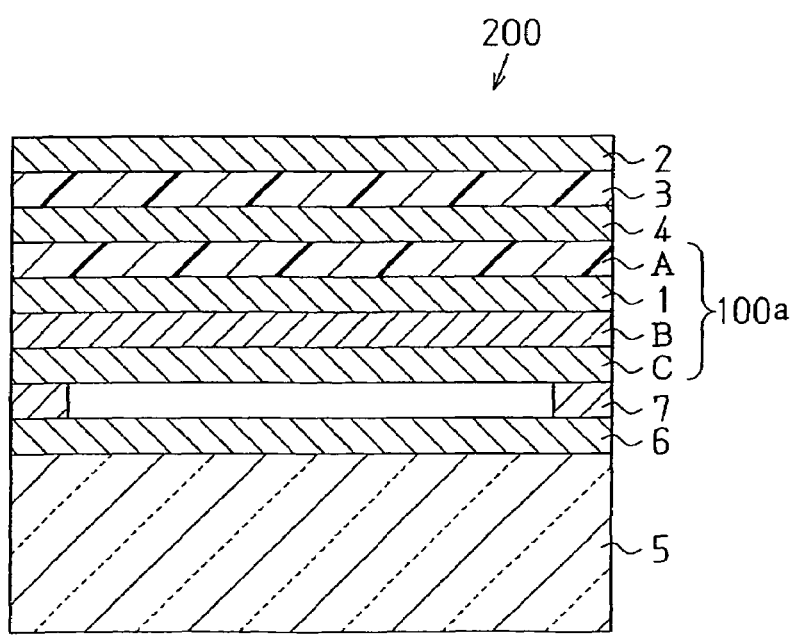
FIG. 2 is a schematic cross sectional view of a touch panel of Example 5 of the present invention.

The backside of the hard-coat treated PET film prepared in Preparation Example 4 was evenly laminated on the backside of the transparent conductive laminate films of Examples 3 and 4 via acrylic adhesive sheet (product name: NONCAR-RIER, available from Lintec Corporation). A conductive layer of ITO (indium:tin =92:8) was formed on a glass plate having a thickness of 2 mm (product name: FL 2.0, available from Nippon Sheet Glass Co., Ltd.) by a sputtering method as in Example 1. Next, the conductive layer of the transparent conductive laminate film and the conductive layer of the glass plate were faced with each other and the all sides were adhered by double-stick tape to prepare a resistive touch panel 200 shown in FIG. 2.

The resistive touch panel 200 includes a transparent conductive laminate film 100*a* in which an intermediate refractive index layer B and a conductive layer C are laminated via the first hard coat layer 1 formed on the substrate A. The transparent conductive laminate film 100*a* is bonded to a PET film 3 having the second hard coat layer 2 via an adhesive layer 4. The touch panel 200 includes a conductor layer 6 formed on a glass substrate 5. This conductor layer 6 is bonded to the conductive layer C of the transparent conductive laminate film 100*a* via double-stick tape 7.

The total transmittance and transmitted color difference (a*,b*) of the resistive touch panel 200 were measured in the same manner as in Example 1. The results are shown in Table 2.

Comparative Examples 7 to 9

A resistive touch panel was prepared in the same manner as in Example 5 except for using as a transparent conductive film the film of Comparative Example 1 in Comparative Example 7, the film of Comparative Example 2 in Comparative Example 8 and the film of Comparative Example 3 in Comparative Example 9, respectively. The total transmittance and transmitted color difference (a*,b*) of the resistive touch panels were as shown in Table 2.

As shown in Table 2, the touch panels of Examples 5 and 6 had a low transmitted color difference and the coloring of the transmitted light was not noticeable.

On the other hand, the touch panel of Comparative Example 7 using a film which does not have an intermediate refractive index layer B and the touch panels of Comparative Examples 8 and 9 using a film in which the optical thickness of the intermediate refractive index layer is not adequate had a large transmitted color difference, in particular, an extremely large b* value, and the transmitted light colored yellow.

TABLE 2

|  | Examples | | Comparative Examples | | |
|---|---|---|---|---|---|
|  | 5 | 6 | 7 | 8 | 9 |
| refractive index of intermediate layer | 1.77 | 1.85 | — | 1.77 | 1.77 |
| optical thickness of intermediate layer (nm) | 160 | 160 | — | 90 | 190 |
| Hard Coat Layer | formed | formed | none | none | none |
| total transmittance (%) | 80.3 | 80.4 | 79.1 | 74.6 | 81.1 |
| color difference of transmitted light a* | −1.5 | −1.8 | −0.5 | 0.1 | −1.7 |
| b* | 1.5 | 1.7 | 4.3 | 3.4 | 6.0 |

The obtained touch panels were installed in a CRT display and tested the functions. The touch panels of Examples 5 and 6 were capable of indicating all colors on the CRT display accurately, but in the touch panels of Comparative Examples 7 to 9, white on the CRT display was yellowish.

The preferred embodiment can be modified as follows.

The intermediate refractive index layer B may be composed of two layers. Of the two intermediate refractive index layers B, it is preferable that the layer closer to the substrate A has a small refractive index and the layer closer to the conductive layer C has a greater refractive index, in the refractive index range of 1.7 to 1.85. In this case, the reflectance of the transparent conductive laminate film can be made smaller and the transmittance higher.

The optical thickness and the refractive index of the intermediate refractive index layer B may be determined according to the following formula so that the reflected light from the surface of the substrate A interferes with the reflected light from the surface of the intermediate refractive index layer B to cancel each other out. In the formula, λ represents the wavelength of the reflected light.

$$2\times(\text{optical thickness of intermediate refractive index layer B})/\lambda = \frac{1}{2}$$

Electron beam may be irradiated when the intermediate refractive index layer B is formed by curing a mixture of metal oxide and curable monomers by a wet coating method. In this case, the intermediate refractive index layer B cures rapidly.

The viscosity may be adjusted to achieve a desired optical thickness by adding a viscosity controlling agent (thickener) to the mixed solution of metal oxide and curable monomers for forming an intermediate refractive index layer B.

The invention claimed is:

1. A transparent conductive laminate film comprising:
a light transmitting substrate;
an intermediate layer laminated on one or both surfaces of the substrate directly or indirectly via at least one layer and having an optical thickness of 100 to 175 nm; and
a conductive layer laminated on the intermediate layer and having an optical thickness of 10 to 60 nm, wherein the intermediate layer has a refractive index of 1.7 to 1.85, and wherein the refractive index of the light transmitting substrate is less than the refractive index of the intermediate layer, and the refractive index of conductive layer is greater than the refractive index of the intermediate layer (refractive index of substrate<refractive index of intermediate layer<refractive index of conductive layer).

2. The transparent conductive laminate film according to claim 1, wherein the conductive layer is made of a metal or a metal oxide.

3. The transparent conductive laminate film according to claim 1, wherein the conductive layer contains indium tin oxide.

4. The transparent conductive laminate film according to claim 1, wherein the substrate is a plastic film having a thickness of 10 to 500 nm.

5. The transparent conductive laminate film according to claim 1, which has a first surface located closer to the conductive layer, wherein the first surface has a local minimum reflectance wavelength within the range of 380 to 500 nm.

6. The transparent conductive laminate film according to claim 5, wherein the first surface has a local minimum reflectance wavelength within the range of 450 to 500 nm.

7. The transparent conductive laminate film according to claim 1, which has a transmitted color difference of −2<a*<2 and −2<b*<2 in a L*a*b color system.

8. The transparent conductive laminate film according to claim 1, wherein the conductive layer is in contact with the intermediate layer and the substrate.

9. The transparent conductive laminate film according to claim 1, wherein the intermediate layer is a mixture of an inorganic substance and an organic substance.

10. The transparent conductive laminate film according to claim 9, wherein the intermediate layer is a cured product of a mixture of a metal oxide and a curable monomer.

11. The transparent conductive laminate film according to claim 10, wherein the curable monomer is an ultraviolet-curable monomer.

12. A touch panel comprising:
electrode substrates faced with each other; and
a transparent conductive laminate film laminated above the electrode substrates, wherein the transparent conductive laminate film includes a light transmitting substrate, an intermediate layer laminated on one or both surfaces of the substrate directly or indirectly via at least one layer and having an optical thickness of 100 to 175 nm, and a conductive layer laminated on the intermediate layer and having an optical thickness of 10 to 60 nm, wherein the intermediate layer has a refractive index of 1.7 to 1.85, and wherein the refractive index of the light transmitting substrate is less than the refractive index of the intermediate layer, and the refractive index of the conductive layer is greater than the refractive index of the intermediate layer (refractive index of substrate<refractive index of intermediate layer<refractive index of conductive layer).

* * * * *